Sept. 9, 1930.  M. R. ZECHLIN  1,775,541
BRAKE TESTING APPARATUS
Filed May 25, 1927   2 Sheets-Sheet 1
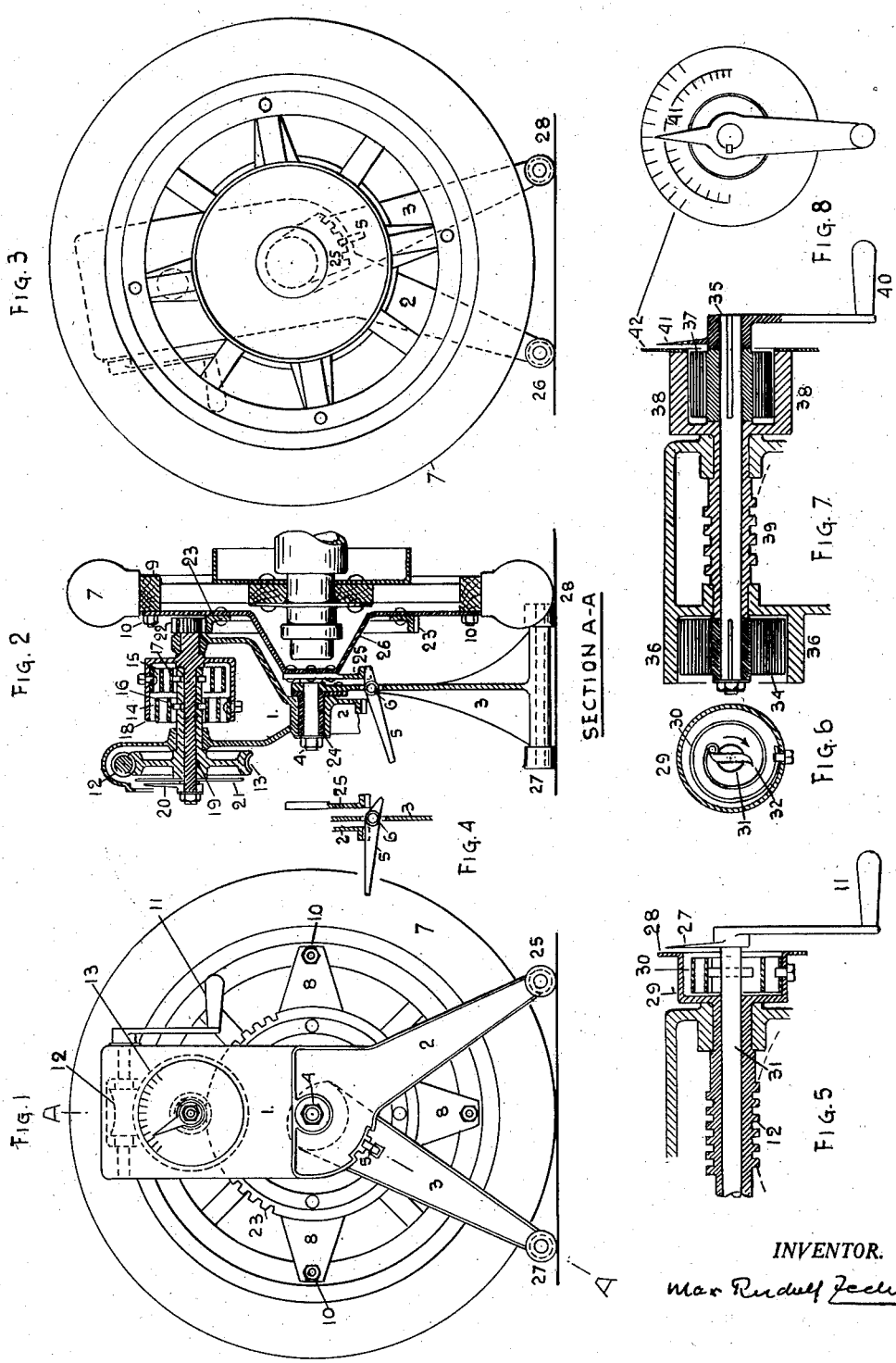
INVENTOR.
Max Rudolf Zechlin Patented Sept. 9, 1930

1,775,541

UNITED STATES PATENT OFFICE

MAX RUDOLF ZECHLIN, OF DETROIT, MICHIGAN

BRAKE-TESTING APPARATUS

Application filed May 25, 1927. Serial No. 194,111.

The effect of automobile brakes, at the present time, is tested in the way that the distance is measured at which the car stops on the road after it has been run with a a certain speed and after the brakes have been applied. It is obvious that this method is rather rough, as it is almost impossible to fix the limits of this distance in an accurate manner and as it does not permit determination of the single effect and braking condition of each of the two or four wheel brakes. My invention improves this method by directly and exactly measuring the frictional resistance of each brake so that their individual effects and efficiencies can be compared, and so that they can be adjusted accurately to equalize the braking power upon each of them. Moreover this can be done in the garage without moving the car.

For this end I use an aparatus that is attachable to any car wheel. After the wheel has been lifted so that it clears the floor, a gear, operated by hand or machine, revolves the wheel to which the brake is applied, by the mediation of a reduction gear in order to overcome the frictional resistance of the brake. A torque measuring device, consisting of a yielding device (f. i., a spring) is inserted between the driving and the driven parts of the gear or the wheel, whereby the relative revolving angle between both is shown on a dial connected to one of the parts by a hand connected to one of the other parts.

As the wheel has to be lifted the apparatus may be combined with a jack that, at the same time, forms the reaction support for the driving parts of the gear and that can be used also to lift the car for changing tires or doing repair work.

An instance of this apparatus is shown in Figs. 1 to 12 of the annexed drawings.

Fig. 1 is a front elevation of the apparatus when attached to the wheel before lifting it.

Fig. 2 is a vertical section along the line A—A.

Fig. 3 is a rear elevation after the wheel has been lifted, ready to measure the torque necessary to turn the wheel.

Fig. 4 shows a different position of the key lever which locks both legs of the jack after the wheel has been lifted.

Fig. 5 shows a different location of the spring close to the driving crank.

Fig. 6 demonstrates the pawl and ratchet effect of the spring.

Figs. 7 and 8 show an electric measuring device replacing the spring.

Figure 9:
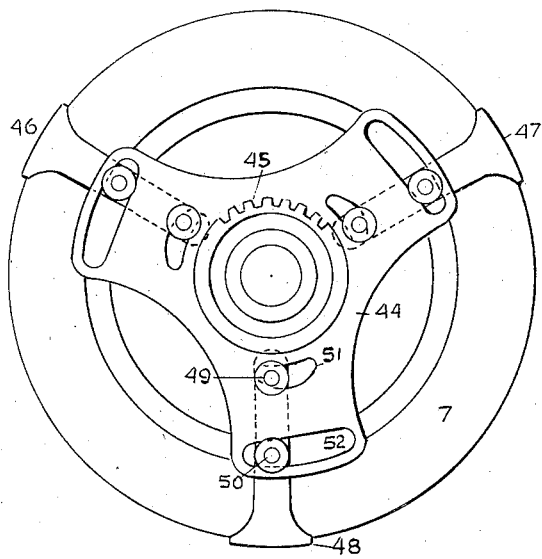
Figure 10:
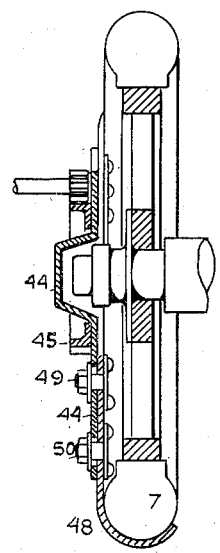

Figs. 9 and 10 show an attaching device of the apparatus, whereby it is fastened to the tires of the wheel.

Figure 11:
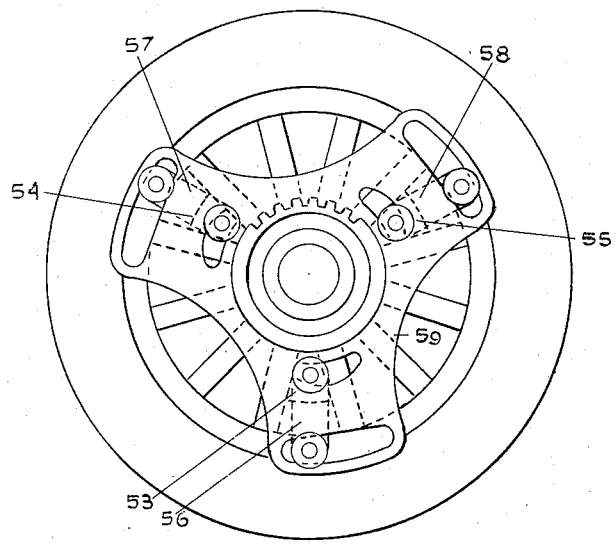
Figure 12:
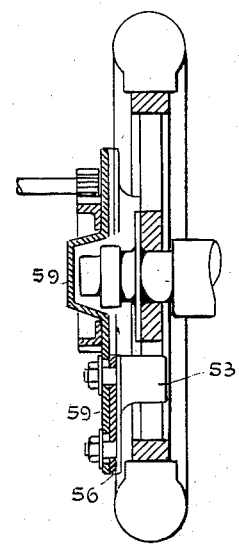

Figs. 11 and 12 demonstrate another attaching device, whereby wedges are applied proper to fit into the space between two adjacent spokes.

Therefore the apparatus consists of these units:

A reduction gear, a torque measuring device, a device to fasten the apparatus to the car wheel and a device for lifting the wheel.

The following is a detailed specification:

Figs. 1 to 4: The apparatus consists of a gear carrying housing 1 with a supporting stationary leg 2 secured thereto and another leg 3 pivoting round the bolt 4 which is fastened to the armshield 26. The leg 3 is locked to leg 2 by a key-lever 5 which is fastened to the leg 3 pivoting about a pin 6 as shown in Fig. 4. In this position the apparatus is moved to the car in order to attach it on the wheel 7. This is done by connecting the arms 8 of the armshield 26 to the rim 9 of the wheel by using the existing bolts and nuts 10.

The driving part of the lifting and wheel revolving device consists of a crank 11, a worm 12 and a worm gear 13 the hub of which is hollow and is extended to the rear where it is connected to a right hand and a left hand spiral spring 14 and 15 in the way that either the one or the other is locked to the hub of the worm gear by a projecting part 16 or 17, while the worm gear is revolving either in one or in the other direction. The outer ends of the springs are connected to a drum 18 which is made integral with the spur gear shaft 19, that is supported in the hollow hub of the worm gear. The front end of this shaft has a hand 20 attached thereto. A dial 21 is fastened to the worm gear. The yielding effect of the spring causes a relative angular motion between the hand and the dial, which is used for measuring the resistance torque of the driven parts. The latter are, besides the drum 18, a spur gear 22 which is in mesh with a larger gear 23 that is fastened to the armshield 26, forming a revolving unit which pivots round the bolt 4. This bolt is carried in a hub 24 forming part of the pivoting leg 3 and being made integral with it. This hub 24 is carried in a bearing of the housing 1. The latter is provided, on its leg 2, with rollers 25 and 26, and the leg 3 is provided with rollers 27 and 28 in order to move the apparatus with the least effort. A tooth segment 25 is riveted to the center part of the armshield 26 that can be connected to the leg 3 by putting the key lever 5 into the position shown in Fig. 2.

After the arms 8 of the armshield are fastened to the wheel by the bolts 10 and after the key lever 5 has been put into the position shown in Fig. 2, the crank will be turned, whereby the power is transferred through the worm gear, the spring, the spur gear, the tooth segment and the key lever to the leg 3, and whereby this leg is moved toward the leg 2, both legs approaching each other. Thereby the wheel is lifted, and the apparatus comes to the position shown by Fig. 3 so that there is enough clearance for the wheel to rotate free of the ground.

Now the key lever 5 is put into the position shown by Fig. 4, i. e., the worm gear being self locking so that the gear cannot reverse and the wheel cannot drop, the key 5 locks the leg 3 to the leg 2 and releases the gear parts. By further turning the crank the wheel, having the brake applied thereto, can be revolved. The braking resistance causes a deflection of the spring which is shown on the dial by the hand. The size of the angle, in a certain scale, indicates the amount of torque necessary to overcome the brake friction.

The arrangement of one left hand and one right hand spring allows the testing of the brake when the wheel is rotated in either direction.

Figs. 7 and 8 show the application of an electric device as a yielding member between the driving and the driven parts. A generator armature 34 is fastened to the rear end of the crankshaft 35 revolving between poles 36. The current generated by turning the crank is transferred to the armature 37 fastened to the front end of the crank shaft which revolves between poles 38 forcing the latter to revolve due to the electro-magnetic tension between them. The pole housing 38 is made integral with the worm 39 so that the revolving movement is transferred to the reduction gear and to the car wheel, when the crank 40 is turned. This crank has a hand 41 moving on a dial 42 fastened to the pole housing 38. The resistance of the brake delays the rotation of the pole housing 38 with reference to the revolving velocity of the crank. This delay is shown by the angular difference between the hand and the dial.

The way of attaching the gear to the wheel by using the rim bolts 10 or the hub bolts of a disc wheel can be varied in the manner that the gear may be attached to the spokes of the wheel or to the tires, as demonstrated by Figs. 9 to 12.

Figs. 9 and 10 show wheels 7. The armshield 44 has three arms and it is made integral with the gear 45 corresponding to the gear 23 in Figs. 1 and 2. These three arms form the guides for the three clamps 46, 47 and 48 which grasp the tire. They are provided each with piloting bolts or pins 49 and 50, which are piloted in oval cut-outs 51 and 52 of the shield. The outer curve of the cut-out 51 is shaped in the way that, while turning the shield in the one or the other direction the bolt 49 and through it the clamp 48 is moved radially toward the center of the wheel whereby the clamping of the tire is effected and the apparatus is fastened in a solid manner to the wheel. The bolt 50 has enough clearance in the cut-out to allow the shield to be revolved at a certain angle, just enough to clamp the tire.

The same crank and reduction gear which operates the apparatus for lifting the wheel and testing the brakes is used to revolve the shield 44 relatively to the clamps 46, 47 and 48 to attain their grasping effect on the tire.

Figs. 11 and 12 demonstrate a similar method of attaching the apparatus to the wheel, whereby three wedge shaped parts 53, 54 and 55 are forced between the spokes of the wheel. These wedges are made integral with parts 56, 57 and 58 which are guided by the arms of the armshield 59 in the same way as described with Figs. 9 and 10. When the armshield is revolved by the reduction gear these wedges are moved radially toward the center of the wheel, whereby they come to a press-fit with the spokes and fasten the apparatus solidly to the wheel.

This apparatus can also be used to determine the wheel loading and the weight of a car, as the torque necessary to crank the gear for lifting the wheel or the car is in direct proportion to the load to be lifted. Therefore another scale can be provided on the dial showing the weight of the lifted part, as shown in Fig. 8.

Claims:

1. A brake testing apparatus of the class described, comprising in combination, means for rotating a wheel; means for measuring the torque resistance of said wheel; and means operable prior to the operation of said rotating means for raising and supporting said wheel in a lifted position, and for subsequently operating said torque measuring means.

2. A brake testing apparatus of the class described, comprising: a reduction gearing; means for connecting said reduction gearing to a vehicle wheel; a lifting device; a torque measuring device; and common means for operating said lifting device and said torque measuring device.

3. A brake testing apparatus of the class described, comprising: a supporting member; a leg rigidly attached to said member means for attaching said supporting member to a vehicle wheel; means for causing said leg to approach the vertical subsequent to attachment for raising said wheel clear of its normal supporting surface; torque measuring means; means for rotating said wheel; and means for transmitting the resistance of said wheel to said torque measuring means.

4. A brake testing apparatus of the class described, comprising: a supporting member; relatively moving supporting legs mounted on said supporting member, said legs being normally inclined and spread apart; means for attaching said supporting member to a vehicle wheel; means for bringing said legs into closer approach for raising said wheel clear of its normal supporting surface; means for rotating said wheel while in lifted position; and torque measuring means operable upon the rotation of said wheel for measuring the torque resistance thereof.

5. A brake testing apparatus of the class described, comprising: a supporting member; a diagonally extending, depending leg on said supporting member; a leg swingably mounted on said supporting member and normally spread apart from said first leg means for attaching said supporting member to a vehicle wheel; gearing and means operable upon the rotation of said gearing for moving said legs into approach and raising said wheel clear of its normal supporting surface; means for rotating said wheel; means for locking said legs in fixed relation during the rotation of said wheel; torque measuring means; and means for transmitting the torque resistance of said wheel upon rotation thereof to said torque measuring means.

6. A brake testing apparatus of the class described, comprising: a lifting device; means for connecting said lifting device to a vehicle wheel; a torque measuring device; and common means for operating said lifting device and said torque measuring device.

MAX RUDOLF ZECHLIN.